July 27, 1965 K. H. LANGE 3,196,770
CAMERA FLASHLAMP
Filed Aug. 22, 1962

INVENTOR:
Karl Heinz Lange
By Maxwell E. Sparrow
ATTORNEY

United States Patent Office 3,196,770
Patented July 27, 1965

3,196,770
CAMERA FLASHLAMP
Karl Heinz Lange, Bunde-Ennigloh, Westphalia, Germany, assignor to Balda-Kamerawerk Rudolf Grüter, Kommanditgesellschaft, Bunde, Westphalia, Germany, a German company
Filed Aug. 22, 1962, Ser. No. 218,604
Claims priority, application Germany, Sept. 1, 1961, B 63,861
1 Claim. (Cl. 95—11)

The present invention relates to cameras and it is an object of the invention to provide an improved camera having a built-in flash unit.

According to the present invention there is provided a camera having a built-in flash unit, such unit comprising a compartment at its upper part adapted to receive means e.g. a battery for energising a flash bulb and containing inter alia a holder for the bulb, and a reflector, the reflector being of substantially the same height as the said compartment and having a member projecting into a recess in the main housing of the camera, the said member being urged by spring means out of its recess, the arrangement being such that when the said member is urged into its recess the reflector is retracted into the said compartment and when the spring means are allowed to urge the said member out of its recess the reflector takes up a functional position.

Other features of the invention will become apparent from the following description by way of example, of an embodiment of it made with reference to the accompanying drawings wherein.

Figure 1:
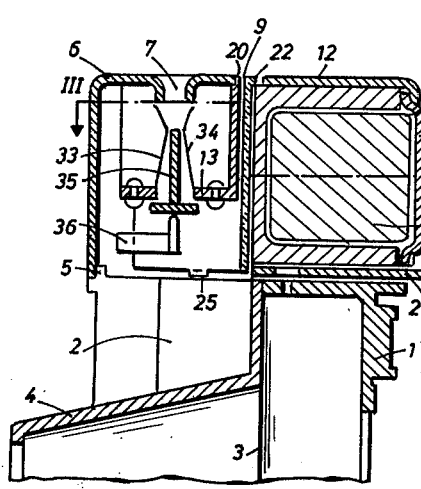
FIGURE 1 is a cross-section through the flash unit along the central axis of the parabolic reflector, or the sectional line I—I in FIGURE 3.
Figure 2:
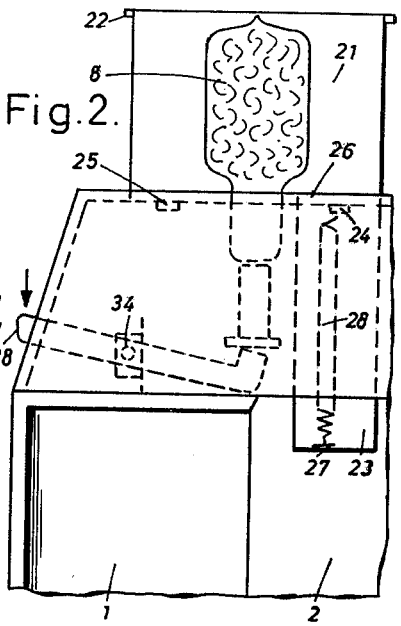
FIGURE 2 is a front view, with the reflector in the extended position, the flash bulb inserted and with the ejector mechanism shown in broken lines.
Figure 3:
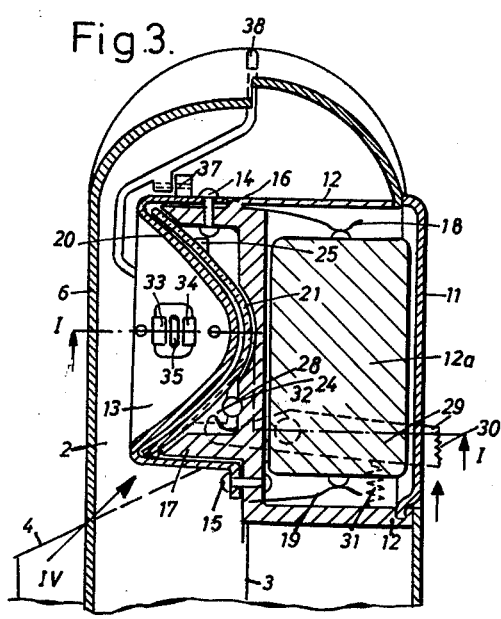
FIGURE 3 is a section on the line III—III in FIGURE 1.
Figure 4:
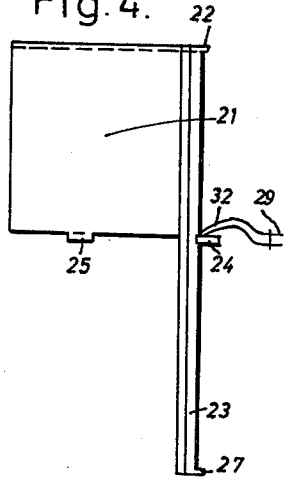
FIGURE 4 is a detail seen in the direction IV in FIGURE 3.

In the drawings the main camera housing 1 is provided with a recess or aperture 2 in its centre practically as far as its longitudinal axis, its shutter bearer 4 being screwed onto a surface 3 in said recess or aperture.

The camera top 6 engages over an edge 5 of the housing to define an upper compartment and has an opening 7 for the insertion of the flash bulb 8, the parabolic opening 9, and the rectangular opening 10 which is intended for the insertion of a battery 10a and into which a cover 11 is pushed. Apart from the other components (not shown), such as the range-finder and exposure meter, the interior of the camera top is filled by a battery box 12, made of insulating material, and the flash bulb holder 13. The latter is taken around the outer edges of the reflector 21 and is connected to the battery box 12 by rivets 14 and 15 by way of arms 16 and 17 formed on the battery box, in such manner that the battery contact springs 18 and 19 are also retained by this system.

The lamp holder 13 projects by its upright edge 20 through the slot 9 in the camera top 6 and thus in conjunction with the arms 16 and 17 of the battery box 12 forms a reliable guide for the parabolic reflector 21.

At its top end, the parabolic reflector 21 has the edge 22 while its bottom end has an arm 23 for stiffening purposes. At the point where the arm 23 begins the two lugs 24 and 25 are formed on the parabolic reflector and bear beneath an edge 26 of the battery box 12. A tension spring 28 is secured in an opening 27 in the arm 23 and is secured as close as possible beneath the surface of the top 6.

The milled end 30 of the retaining lever 29 projects at a suitable point from a wall in the housing 1 or the camera top 6, through a slot, and is held in the position illustrated by means of a spring 31.

At the other end, the retaining lever 29 is provided with a bevelled surface 32 which engages behind the lug 24 of the reflector 21 adjacent the spring 28. The flash bulb holder 13 carries the two bulb contacts 33 and 34, between which the ejector 35 is movably guided.

An ejector lever 36 is mounted pivotally in a bracket 37 and its end 38 projects from the camera top at a suitable point.

The mode of operation is as follows:

When the reflector is retracted and hence the top of the camera is freely accessible, a flash bulb 8 is inserted into the opening 7 in the camera top 6 and is held by the contact springs 33 and 34 inside the top and forms part of the known circuit (not shown). Insertion of the lamp 8 causes the ejector 35 and hence the lever 36 to be pressed down. If the end 30 of the retaining lever 29 is now moved against the action of the spring 31, the projection 32 frees the lug 24 of the reflector 21 and the spring 28, which may have the required length by means of the arm 23 connected to the reflector 21, draws the reflector out of the slot 9 in the camera top 6 until the lugs 24 and 25 strike against a somewhat projecting wall 26 of the battery box 12. The flash unit is now ready for operation. After the camera shutter has been released and the flash bulb has burned out, the bulb can be ejected by the application of pressure to the end 38 of the ejector 36. To retract the reflector 21 in the camera, presure is applied to the edge 22 until the reflector has disappeared in the slot 9 in the camera top.

In this position the end of the retaining lever 29 again engages behind the lug 24 of the reflector and retains the same.

The arm 23 may be replaced by a pressure pin in conjunction with a compression spring.

I claim:

A camera having a main housing, a compartment in the upper part of said housing; said compartment having a battery container, a flash bulb holder and a reflector, said compartment having a slot through which said reflector can be extended and retracted, said holder and said battery container defining a guide for said reflector comprising a stiffening member extending from said reflector, a recess in said main housing dimensioned to receive said member and spring means tending to urge said member out of the recess.

References Cited by the Examiner
UNITED STATES PATENTS
2,967,469   1/61   Lachaize _____ 95—11

FOREIGN PATENTS
1,076,456   4/54   France.

JOHN M. HORAN, Primary Examiner.
NORTON ANSHER, Examiner.